(12) United States Patent
Schulz et al.

(10) Patent No.: US 9,608,839 B2
(45) Date of Patent: Mar. 28, 2017

(54) TRANSFER OF INFORMATION WITHIN AN ASIC USING A SLOTTED RING BASED PROTOCOL

(71) Applicant: Oracle International Corporation, Redwood Shores, CA (US)

(72) Inventors: Jurgen Schulz, Redwood Shores, CA (US); Vishak Chandrasekhar, San Jose, CA (US); Yu-cheng Chiu, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 217 days.

(21) Appl. No.: 14/527,385

(22) Filed: Oct. 29, 2014

(65) Prior Publication Data

US 2016/0127147 A1 May 5, 2016

(51) Int. Cl.
*H04L 12/423* (2006.01)
*H04L 12/24* (2006.01)

(52) U.S. Cl.
CPC ........ *H04L 12/423* (2013.01); *H04L 41/0803* (2013.01)

(58) Field of Classification Search
CPC ................... H04L 12/423; H04L 41/0803
See application file for complete search history.

(56) References Cited

U.S. PATENT DOCUMENTS

| | | | | |
|---|---|---|---|---|
| 5,870,387 A * | 2/1999 | Mulla | ............... | G06F 12/0661 370/254 |
| 7,489,638 B2 * | 2/2009 | Keslassy | ............ | H04L 12/5693 370/229 |
| 7,969,985 B1 * | 6/2011 | Cline | ................ | H04L 12/4035 370/394 |
| 2003/0140172 A1 * | 7/2003 | Woods | ............... | G04G 15/006 709/248 |
| 2014/0092923 A1 * | 4/2014 | Ellegard | ............. | H04J 3/0682 370/503 |

* cited by examiner

*Primary Examiner* — Mohamed Kamara
*Assistant Examiner* — Thad Defauw
(74) *Attorney, Agent, or Firm* — Osha Liang LLP (57) ABSTRACT

A system, comprising: a first local controller (LC) having a first position in a ring network and comprising a first LC cycle counter; a second LC having a second position in the ring network and comprising a second LC cycle counter; and a central controller (CC) connected to the ring network and comprising: a data structure linking the first LC to the first position and linking the second LC to the second position; and a CC cycle counter.

20 Claims, 8 Drawing Sheets

TRANSFER OF INFORMATION WITHIN AN ASIC USING A SLOTTED RING BASED PROTOCOL

BACKGROUND

Reporting events in a network of nodes has grown increasingly complex. As network size increases with the number of nodes, point-to-point event reporting eventually becomes impractical from the standpoint of the number of interconnections required and corresponding surface area of a die required. Improving the connection mechanism by which events are reported can simplify the topology of the network and reduce resource requirements.

SUMMARY

In general, in one aspect, the invention relates to a system. The system comprises: a first local controller (LC) having a first position in a ring network and comprising a first LC cycle counter, wherein the first LC is configured to send a first event message on the ring network during a first clock cycle in response to the first LC cycle counter matching the first position during the first clock cycle; a second LC having a second position in the ring network and comprising a second LC cycle counter, wherein the second LC is configured to send a second event message on the ring network during a second clock cycle in response to the second LC cycle counter matching the second position during the second clock cycle; and a central controller (CC) connected to the ring network and comprising: a data structure linking the first LC to the first position and linking the second LC to the second position; and a CC cycle counter configured to store the first position during a third clock cycle and to store the second position during a fourth clock cycle, wherein the CC is configured to send, on the ring network, a first command to the first LC during the third clock cycle and a second command to the second LC during the fourth clock cycle.

In general, in one aspect, the invention relates to a method of operating a central controller (CC) connected to a first local controller (LC) and a second local controller (LC) by a ring network. The method comprises: receiving, by the CC and from the ring network, a first event message during a first clock cycle and a second event message during a second clock cycle, wherein the first event message is generated by the first LC and the second event message is generated by the second LC; reading, by the CC, a first value from a CC cycle counter during the first clock cycle and a second value from the CC cycle counter during the second clock cycle; retrieving, by the CC and from a data structure in the CC, an identification value of the first LC based on the first value and an identification value of the second LC based on the second value; sending, in response to the CC cycle counter having the first value during a third clock cycle, a first command on the ring network for the first LC during the third clock cycle; and sending, in response to the CC cycle counter having the second value during a fourth clock cycle, a second command on the ring network for the second LC during the fourth clock cycle.

In general, in one aspect, the invention relates to a method of operating a plurality of local controllers (LCs) connected to a central controller (CC) by a ring network. The method comprises: receiving, by a first LC comprising a LC cycle counter and a position register storing a position of the first LC in the ring network, an event message from a local unit; sending, in response to the LC cycle counter matching the position during a first clock cycle, the event message on the network ring during the first clock cycle; receiving, by the first LC from the ring network, a command from the CC during a second clock cycle, wherein the LC cycle counter matches the position during the second clock cycle, and wherein the command is in response to the event message; sending, by the first LC, the command to the local unit.

Other aspects of the invention will be apparent from the following description and the appended claims.

BRIEF DESCRIPTION OF DRAWINGS

Certain embodiments of the disclosure will hereafter be described with reference to the accompanying drawings. It should be understood, however, that the accompanying drawings illustrate the various implementations described herein and are not meant to limit the scope of various technologies described herein. The drawings show and describe various embodiments of the current disclosure.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for operating a central controller and multiple local controllers connected by a ring network. Events are reported on the ring network by the local controllers and the central controller issues commands on the ring network in response.

Figure 1:
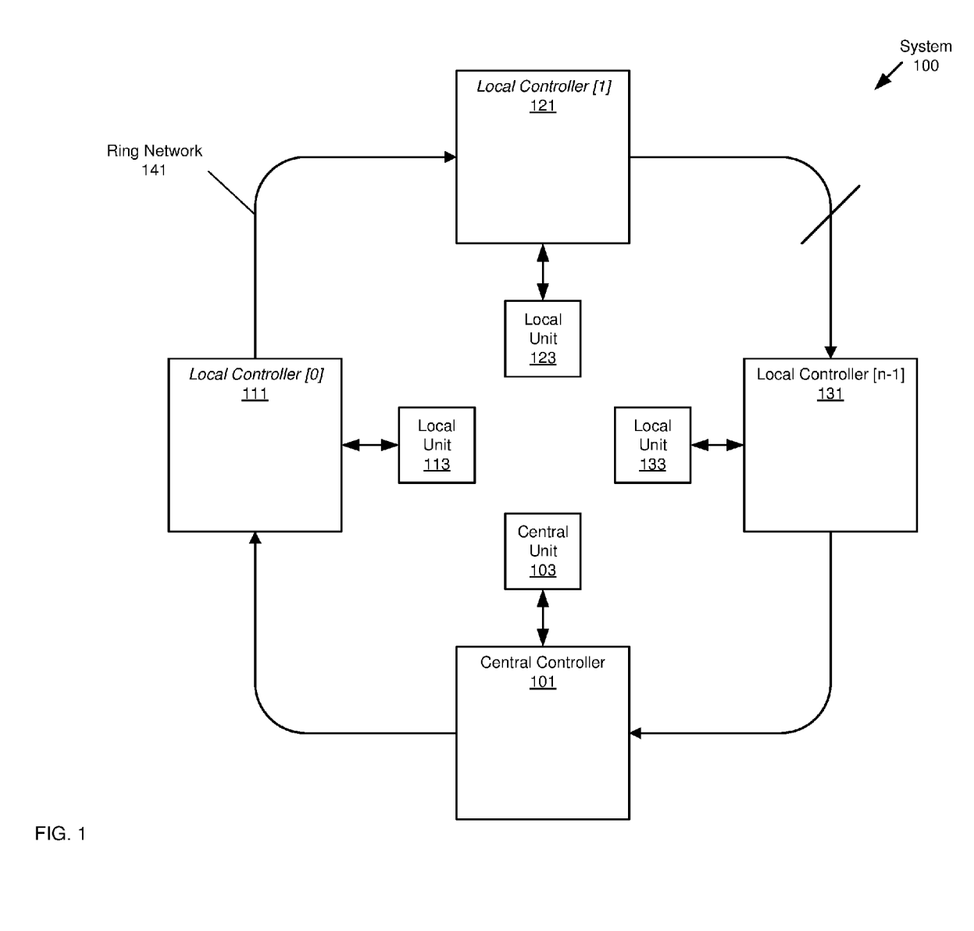
FIG. 1 shows a system including a central controller and multiple local controllers in accordance with one or more embodiments.

FIG. 1 shows a system (100) in accordance with one or more embodiments of the invention. As shown in FIG. 1, the system (100) has multiple components including a central controller (101) connected to multiple local controllers (i.e., Local Controller 0 (111), Local Controller 1 (121), Local Controller n−1 (131)) by a ring network (141). Further, each local controller (111, 121, 131) is connected to a local unit. For example, local controller 0 (111) is connected to local unit (113), local controller 1 (121) is connected to local unit (123), and local controller n−1 (131) is connected to local unit (133). Further still, the central controller (101) is connected to the central unit (103). In one or more of the embodiments, all of the controllers (101, 111, 121, 131), the local units (113, 123, 133), the central unit (103), and the ring network (141) are located on a single chip (e.g., an application-specific integrated circuit (ASIC) chip).

In one or more embodiments of the invention, the local controllers (111, 121, 131) send event messages (discussed below) to the central controller (101) using the ring network (141). Similarly, the local controllers (111, 121, 131) receive commands from the central controller (101) using the ring network (141). In one or more embodiments, the ring network (141) is unidirectional. Accordingly, a command sent by the central controller (101) using the ring network (141) and destined for local controller n−1 (133) will pass through (e.g., be relayed by) local controller 0 (111) and local controller 1 (121) before reaching local controller n−1 (131). Similarly, an event message sent by local controller 0 (111) using the ring network (141) will pass through (e.g., be relayed by) local controller 1 (121) and local controller n−1 (131) before reaching the central controller (101).

In one or more embodiments of the invention, a clock signal is shared among the central controller (101) and the multiple local controllers (111, 121, 131). The multiple local controllers (111, 121, 131) send event messages, on the ring network (141), and receive commands, from the ring network (141), during clock cycles of the clock signal (discussed below). Similarly, the central controller receives event messages, from the ring network (141), and sends commands, on the ring network (141), during clock cycles of the clock signal (discussed below).

As discussed above, each local controller (111, 121, 131) is connected to a local unit (113, 123, 133). A local unit (113, 123, 133) may correspond to any sub unit of design (e.g., link unit, protocol unit, memory controller unit, etc.). Moreover, during operation of a local unit (113, 123, 133), the local unit (113, 123, 133) may experience fatal events and non-fatal events. These events (or any other type of information) are reported to the corresponding local controller (111, 121, 131), and the corresponding local controller (111, 121, 13) sends the reported events as event messages to the central controller (101) on the ring network. In one or more embodiments, the local unit (113, 123, 133) generates the event message and provides it to the local controller (111, 121, 131) for sending to the central controller (101). Additionally or alternatively, the local controller (111, 121, 131) generates the event message based on the reporting of the local unit (113, 123, 133). The local controller (111, 121, 131) provides the command(s) received from the central controller, in response to the event message, to the local unit (113, 123, 133) for execution.

In one or more embodiments of the invention, an event message can carry any type of information. This information might or might not be related to an event that occurred at the local unit. In other words, an event need not take place for an event message to be sent by the local controller (111, 121, 131), As discussed above, the central unit (103) is connected to the central controller (101). The central unit (103) may generate a command for responding to an event message based on the event message and the identification of the local controller that sent the event message. The generated command is provided to the central controller (101) for sending to the local controller connected to the local unit that reported the event. In one or more embodiments, if the event is a fatal event, the command is for the local unit that experienced the event to cease operations (i.e., cease op). In one or more embodiments, if the event is a non-fatal event, the command is a reset. In one more embodiments, the central controller (101) does not issue any command in response to a non-fatal event. Many other types of commands exist.

In one or more embodiments of the invention, a command can carry any type of information. This information might or might not be related to an event message received by the central controller (101). In other words, an event message need not be received for the central controller (111, 121, 131) to send a command.

In one or more embodiments of the invention, the ring network (141) is a bus. The bus may have any number of lines (e.g., 16 lines). In one or more embodiments of the invention, one of the lines in the ring network (141) is a fatal event line. In such embodiments, event messages reporting fatal events can only be sent when the fatal event line is asserted (discussed below). Furthermore, each connection from one local controller to another local controller on the ring network (141) may be comprised of one or more stages to pipeline the ring network.

In one or more embodiments of the invention, the system (100) operates in multiple phases including a training phase and an active phase. During the training phase (discussed below), each local controller (111, 121, 131) discovers its position in the ring network (141). Also during the training phase, the central controller (101) discovers the number of local controllers in the ring network (141), the identities/types of the local controllers, and the positions of the local controllers in the ring network (141). During the active phase (discussed below) after the training phase, the local controllers (111, 121, 131) send event messages to the central controller (101) and receive commands from the central controller (101).

Figure 2:
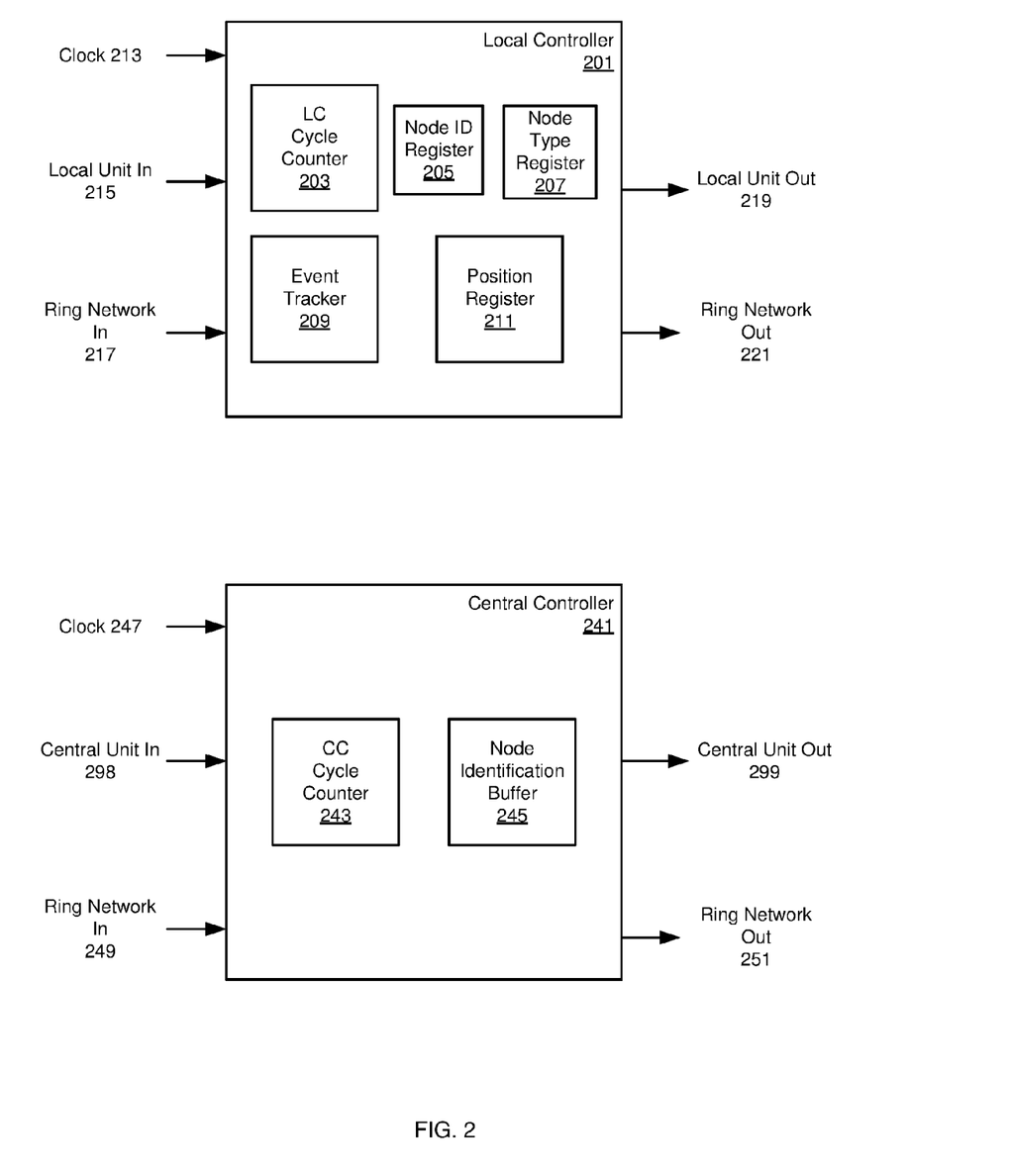
FIG. 2 shows functional block diagrams of a central controller and a local controller in accordance with one or more embodiments.

FIG. 2 shows a block diagram of a central controller (241) and a local controller (201) in accordance with one or more embodiments. The local controller (201) may be essentially the same as any local controller (111, 121, 131) discussed above in reference to FIG. 1. Similarly, the central controller (241) may be essentially the same as the central controller (101) discussed above in reference to FIG. 1.

As shown in FIG. 2, the local controller has multiple components including a local controller cycle counter ("LC cycle counter") (203), a node ID register (205), a node type register (207), an event tracker (209), and a position register (211). Further, the local controller (201) has multiple inputs: clock (213), local unit in (215), and ring network in (217). Further still, the local controller (201) also has multiple outputs: local unit out (219) and ring network out (221).

In one or more embodiments, during the active phase, the LC cycle counter (203) counts each cycle of the clock (213) signal up to a maximum value, and then resets (i.e., starts counting again from zero). The position register (211) stores the position (e.g., 2, 5, 9, etc.) of the local controller (201) within the ring network (141).

In one or more embodiments, the node ID register (205) stores an identification value reflecting the identity of the local controller (201). For example, the identification value may be a serial number, which might or might not be unique. The node type register (207) stores a value reflecting the type of the local controller (201). In one or more embodiments, the node type value may indicate that the local controller (201) is a link node, domain node, or switch node. However, one skilled in the art will appreciate that the node type value is not limited to only these values.

In one or more embodiments, the event tracker (209) stores event reports and/or event messages that are received from the local unit via connected to the local unit (not shown) via local unit in (215). In one or more embodiments, event messages are only sent on ring network out (221) when the LC cycle counter (203) value matches (i.e., equals) the position register (211) value. In one or more embodiments, commands are only received from ring network in (217) when the LC cycle counter (203) value matches (i.e., equals) the position register (211) value.

Still referring to FIG. 2, the central controller (241) includes a central controller cycle counter ("CC cycle counter") (243) and a node identification buffer (245). Further, the central controller (241) has multiple inputs including: clock (247), central unit in (298), and ring network in (249). Those skilled in the art, having the benefit of this detailed description, will be appreciate that clock (213) and clock (247) may originate from the same clock signal generator, some multiple of a generated clock signal, or different clock signals entirely. Further still, the central controller (241) has multiple outputs including: ring network out (251) and central unit out (299).

In one or more embodiments, during the active phase, the CC cycle counter (243) counts each cycle of the clock (247) signal up to a maximum value, and then resets (i.e., starts counting again from zero). In one or more embodiments of the invention, the node identification buffer (245) stores the identities and types of each local controller in the system (100) along with the position of each local controller in the ring network. In other words, the node identification buffer (245) provides the linking/mapping between positions in the ring network and the local controllers at the positions.

In one or more embodiments of the invention, the central controller (241) sends (via ring network out (251)) a command to a local controller only when the CC cycle counter (243) matches the position of the local controller. In one or more embodiments of the invention, the central controller (241) is able to determine the position of the local controller that generated an event message based on the value of CC cycle counter (243) when the event message arrived via ring network in (249). The identity of the local controller may then be determined by searching the node identification buffer (245) that links/maps positions to local controller identities.

Those skilled in the art, having the benefit of this detailed description, would appreciate that either the local controller (201) or the central controller (241) may, include Single Error Correcting (SEC) (not shown) units that enable Error Checking and Correction (ECC) for one or more of their respective inputs and outputs. Further, although the central controller (241) is shown as having a node identification buffer (245), those skilled in the art, having the benefit of this detailed description will appreciate that any data structure may be used to link/map positions to local controller identities.

Figure 3:
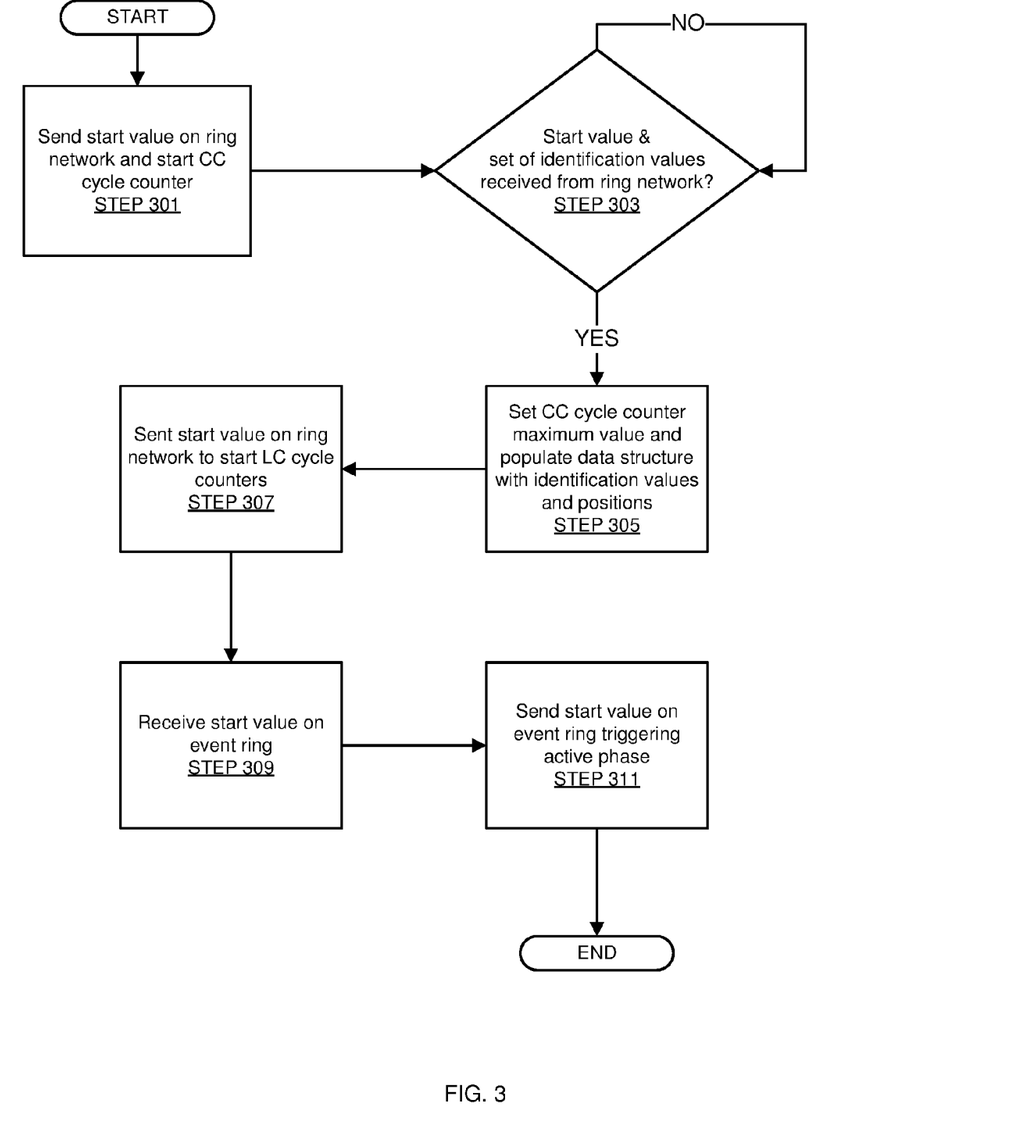
FIG. 3 shows a flow chart for operating a central controller within a ring network during a training phase in accordance with one or more embodiments.

FIG. 3 shows a flow chart for operating a central controller during the training phase in accordance with one or more embodiments. In other words, the steps shown in FIG. 3 relate to the startup of a ring network in which a central controller triggers a training sequence to determine the size of the ring and the identification of each local controller.

Initially, the central controller sends a start value on the ring network and starts its CC cycle counter (Step 301). In one or more embodiments, the start value may be, for example, "1" or any predetermined value. When the first local controller receives the start value, it relays (i.e., outputs) the start value followed by its identification value. The second local controller then receives the start value and the identification value of the first local controller. In response, the second local controller relays (i.e., outputs) the start value, the identification value of the first local controller, and the identification value for the second local controller. The final local controller receives the start value and a set of identification values for the previous/earlier local controllers in the ring network. In response, the final local controller effectively concatenates its identification value to the set and relays (i.e., outputs) the start value followed by the set of identification values.

In Step 303, the central controller determines whether the start value and the set of identification values have been received by sampling the ring network at least once each clock cycle. If the central controller does not receive the start value, it continues to sample the event ring at least once each cycle. However, when it is determined that the start value and the set of identification values have been received, the process proceeds to Step 305.

In Step 305, the maximum value of the CC cycle counter is set. In one or more embodiments of the invention, the maximum value equals the value of the CC cycle counter when the start value was received by the central controller from the ring network. The CC cycle counter will now count from 0 to this maximum value, and then repeat. Further, the node identifier buffer (or other data structure) is populated with the identification value of each local controller and the position of each local controller. The position of a local controller may be determined by the position of its identification value in the set of received identification values. For example, the identification value immediately after the start value corresponds to the local controller in the first position. Similarly, the last identification value received corresponds to the local controller in the last position. The number of positions (and thus the number of local controllers) is equal to the cardinality of the set.

In Step 307, the central controller sends another start value on the event ring network. This second start value may be the same or different than the start value sent in Step 301. Upon receipt of this second value, each local controller initiates its LC counter. The central controller again samples the event ring network at least once each cycle until receiving this second start value (Step 309).

Finally, in Step 311, the central controller sends a third start value on the event ring network. This third start value may be the same or different than the second start value in Step 307 and/or the first start value in Step 301. This third start value is received by all of the local controllers and signals/triggers the start of the active phase. In response to receiving the third start value, each local controller sets the maximum value of its LC cycle counter. The LC cycle counter will now count from 0 to this maximum value, then repeat.

One or more embodiments in accordance with FIG. 3 have been described as an example of a series of actions taken by the central controller. It should be appreciated that the series of actions is not necessarily in any particular order and various embodiments could implement the actions in a different order. Further, some steps may be repeated and some steps may be performed in parallel.

Figure 4:
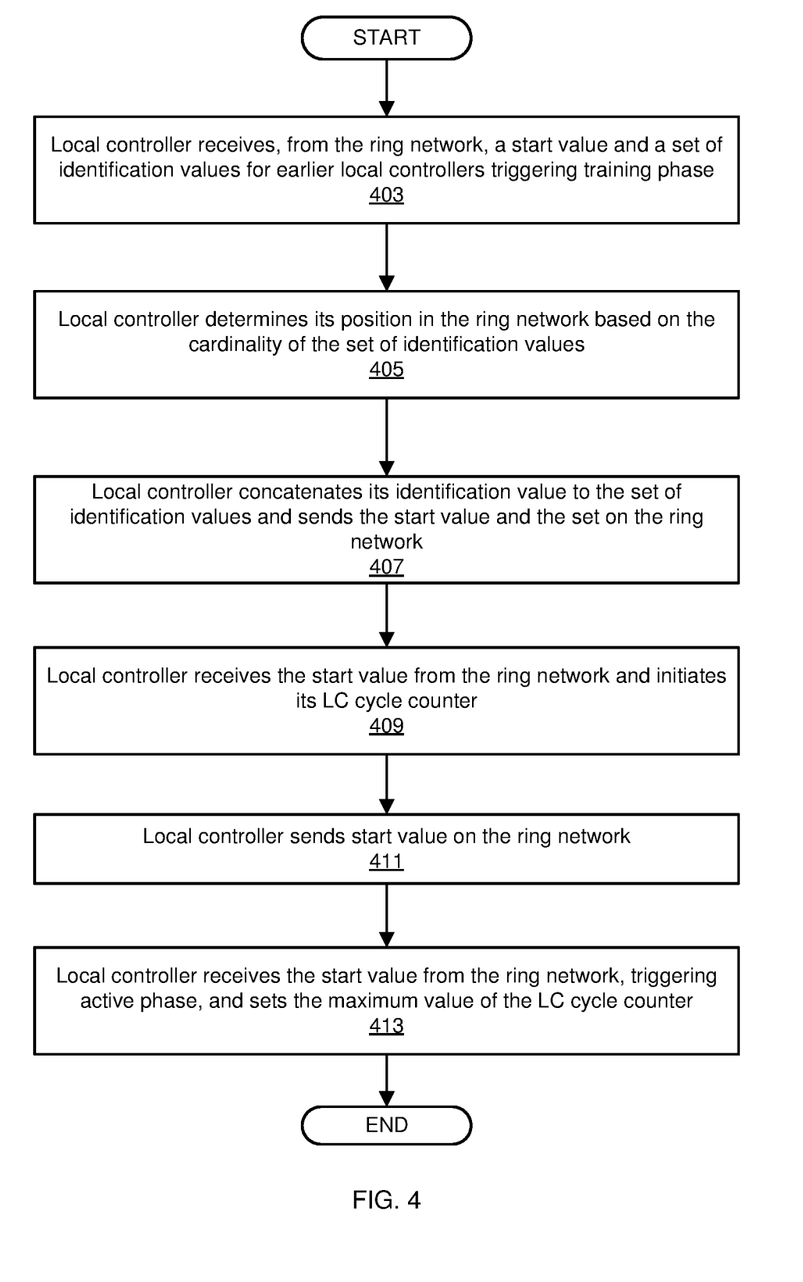
FIG. 4 shows a flow chart for operating a local controller within a ring network during a training phase in accordance with one or more embodiments.

FIG. 4 shows a flow chart for operating a local controller within the ring network during the training phase in accordance with one or more embodiments. More specifically, the steps in FIG. 4 relate to the startup of a ring network.

In Step 403, as the local controller samples the event ring network at least once per clock cycle, the local controller receives a start value and a set of identification values from the ring network. This first start value is sent by the central controller (e.g., Step 301 in FIG. 3). The set of identification values are for the local controllers that are earlier in the network ring (i.e., local controllers that have received the start value before the present local controller). The arrival of the first start value triggers the training phase. As discussed above, the start value may be "1" or any other predetermined value.

In Step 405, the local controller determines its position in the ring network based on the cardinality of the set of identification values. For example, if the set has 5 identification values, this means that there are five local controllers between the central controller and the present local controller. Accordingly, the local controller is at position 6. The determined position may be stored in the position register of the local controller.

In Step 407, the local controller concatenates its identification value with the set of identification values. The local controller sends (relays) the start value on the ring network followed by the set of identification values.

In Step 409, the local controller receives the second start value from the ring network. The second start value may be identical to the first start value. In response to receiving the second start value, the local controller starts its LC cycle counter. The local controller then sends (relays) the second start value on the ring network (Step 411).

In Step 413, the local controller will receive a third start value from the ring network. This third start value might or might not be the same as the first start value or the second start value. This triggers the active state. At this point, the local controller sets the maximum value of its LC cycle counter. The maximum value of its LC cycle counter may be the value of its LC cycle counter when the third state value was received. In this way, the local controller stores the size of the event ring network and how many cycles it will take to complete a loop. The LC cycle now counts from 0 to the maximum value, then repeats. The local controller sends (relays) the third start value on the ring network.

One or more embodiments in accordance with FIG. 4 have been described as an example of a series of actions taken by the local controller. It should be appreciated that the series of actions is not necessarily in any particular order and various embodiments could implement the actions in a different order. One or more steps in FIG. 4 may be repeated and/or may be performed in parallel.

Figure 5:
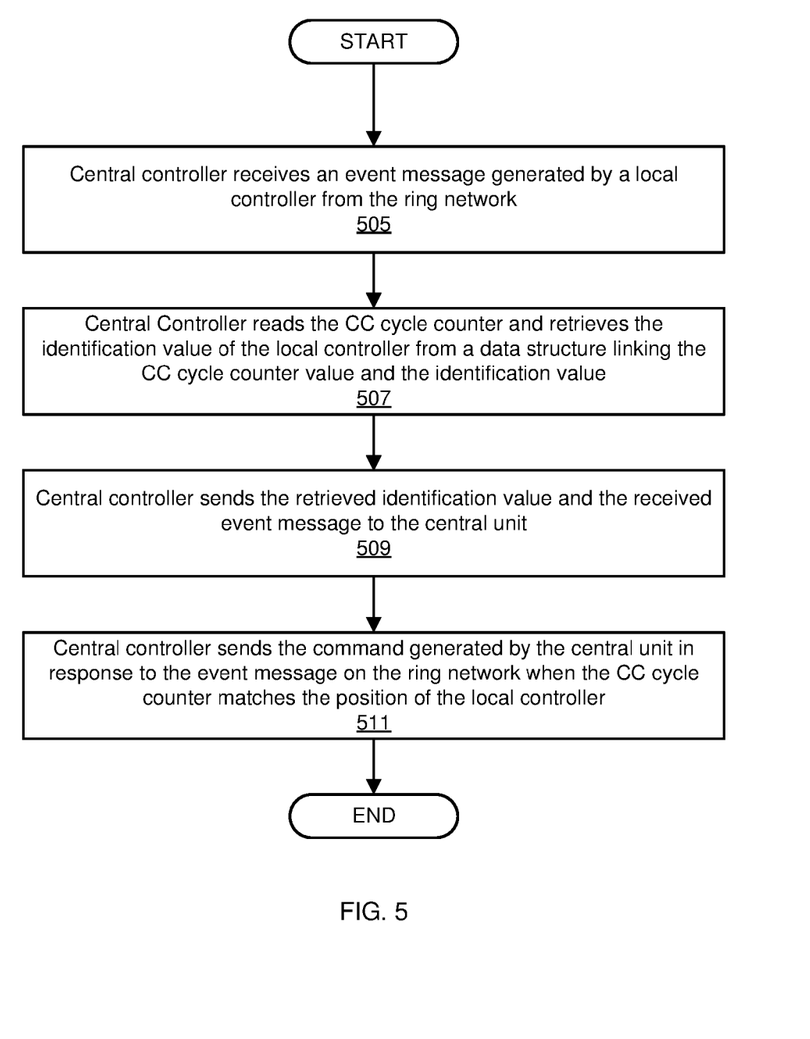
FIG. 5 shows a flow chart for operating a central controller within a ring network during an active phase in accordance with one or more embodiments.

FIG. 5 shows a flow chart for operating the central controller of a ring network during the active phase (or steady-state) in accordance with one or more embodiments. One or more steps in FIG. 5 may be repeated or performed in parallel. In one or more embodiments of the invention, the steps shown in FIG. 5 may be executed after all the steps in FIG. 3 and FIG. 4 (training phase) are executed.

Initially, while sampling the ring network at least once each clock cycle, the central controller receives an event message (Step 505). The event message is generated by one of the local controllers in the ring network. In one or more embodiments of the invention, the event message does not identify the local controller that generated the event message. The event message may report a fatal event or a non-fatal event that has occurred at the local unit connected to the local controller that generated the event message.

In Step 507, the central controller reads the CC cycle counter during the clock cycle in which the event message was received. The value of the CC cycle is the position of the local controller that generated the event message. The central controller then accesses a data structure that links/maps the position to the identification value of the local controller.

In Step 509, the central controller sends the retrieved identification value and the received event message to the central unit. At this point, the central unit makes a decision based upon the received identification data and event message. The central unit may, for example, take into account whether an event is fatal or nonfatal and issue a command to reset or deactivate a local unit, i.e., cease operations.

In Step 511, the command generated by the central unit is sent by the central controller on the ring network. Specifically, the command is sent during a clock cycle in which the CC cycle counter matches the position of the local controller that generated the event message.

Figure 6:
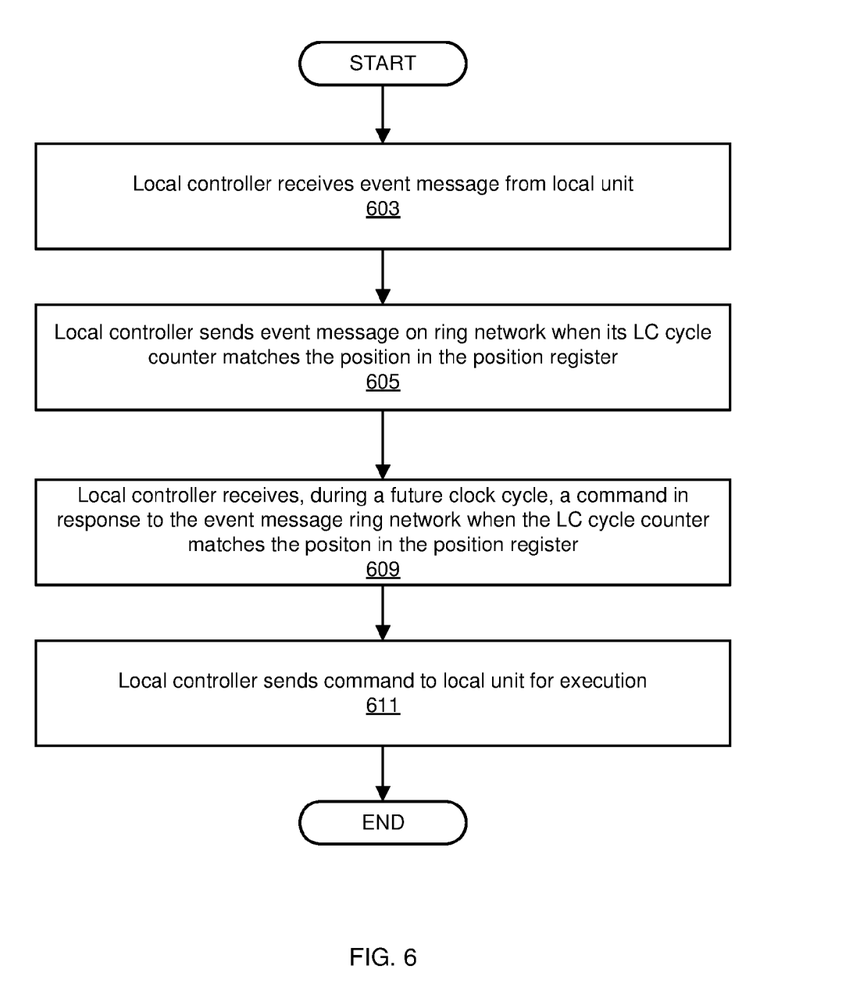
FIG. 6 shows a flow chart for operating a local controller within a ring network during an active phase in accordance with one or more embodiments.

FIG. 6 shows a flow chart for operating a local controller of a ring network during the active phase in accordance with one or more embodiments. One or more of the steps in FIG. 6 may be repeated and/or executed in parallel. In one or more embodiments of the invention, the steps in FIG. 6 are executed after the steps in FIG. 3 and FIG. 4 (training phase) are executed.

Initially, the local controller receives an event message or data regarding an event from the local unit connected to the local controller (Step 603). In the case of an event message, the local controller stores the event message in its event tracker. In the case of event data, the local controller may generate an event message based on the data and store it in its event tracker. As discussed above, the event may be a fatal event or a non-fatal event.

In Step 605, the local controller sends the event message on the ring network. Specifically, the local controller sends the event message during a clock cycle in which the LC cycle counter matches (i.e., equals) the position stored in the position register of the local controller. When the value of the LC cycle counter and the position register match, this indicates that it is the local controller's turn to use the ring network. In one or more embodiments of the invention, one of the lines in the ring network is a fatal event line. In such embodiments, when the event message is for a fatal event, the fatal event line must also be asserted in addition to the LC cycle counter matching the position before the local controller can send the event message on the ring network.

In Step 609, although the local controller may sample the ring network each cycle, a command in response to the event message will only be received during a clock cycle in which the LC cycle counter matches the position of the local controller. The command may be, for example, a request for the local unit to reset or deactivate, i.e., cease operations. The local controller sends the command to the local unit (Step 611).

Thus, in one or more embodiments, the local controller waits for event data/message to be received from the local unit, sends the event message to the central controller, and waits for a command to be issued from the central controller. In the meantime, the local controller passes through (relays) any other data/message received on the event ring network.

Figure 7:
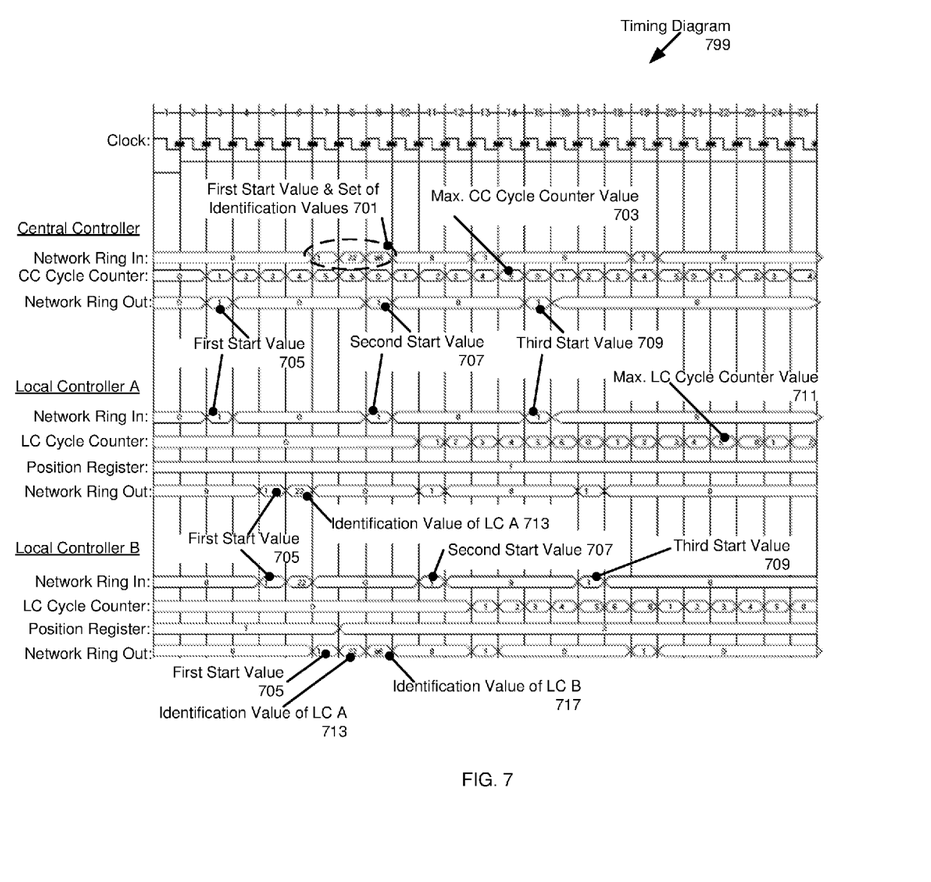
FIG. 7 shows an example timing diagram of a ring network during a training phase in accordance with one or more embodiments.

FIG. 7 shows an example timing diagram (799) in accordance with one or more embodiments of the invention. The timing diagram corresponds to the training phase of a system in which there is a central controller connected to two local controllers (i.e., local controller A, local controller B) via a ring network. As shown in FIG. 7, the timing diagram shows 25 columns, with each column being a clock cycle.

The timing diagram (799) shows the first start value (705), the second start value (707), and the third start value (709) being sent on the ring network by the central controller. The timing diagram (799) also shows local controller A sending/relaying the first start value (705) and the identification value of local controller A (713) on the ring network. Further, the timing diagram (799) shows local controller B sending/relaying the first start value (705), the identification value of local controller A (713), and the identification value of local controller B (717).

Still referring to FIG. 7, the maximum value of the CC cycle counter (703) is set based on the arrival of the first start value and the set of identification value (701) at the central controller. Further, the LC cycle counter in local controller A is started in response to the arrival of the second start value (707). Finally, the maximum value of the LC cycle counter (711) in local controller A is set based on the arrival of the third start value (709).

Figure 8:
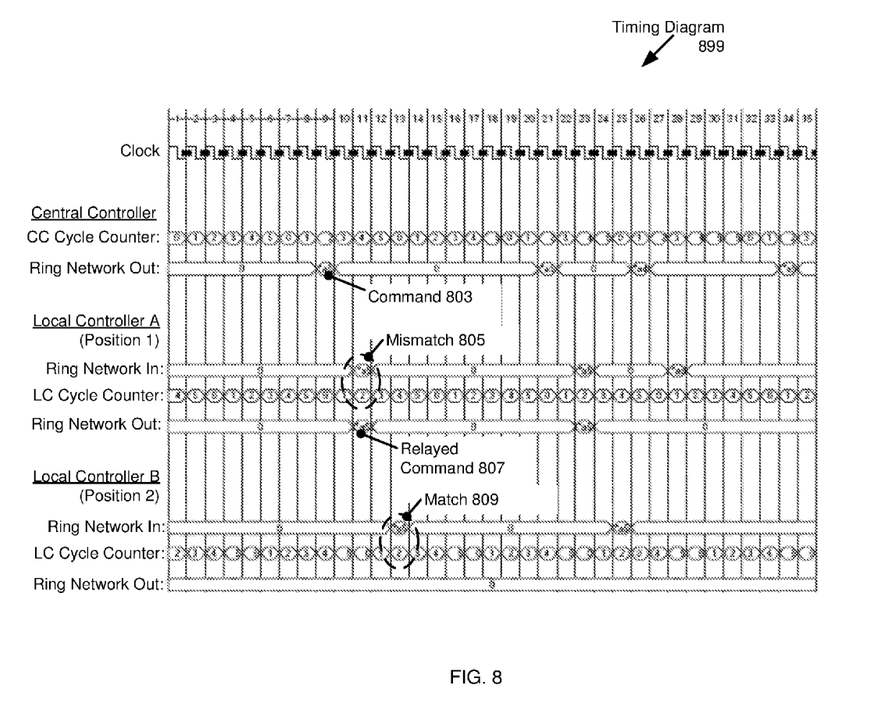
FIG. 8 shows an example timing diagram of a ring network during an active phase in accordance with one or more embodiments.

FIG. 8 shows an example timing diagram (899) in accordance with one or more embodiments of the invention. The timing diagram corresponds to the active phase of a system in which there is a central controller connected to two local controllers (i.e., local controller A, local controller B) via a ring network. Assume that local controller A is in the first position and local controller B is in the second position. Further, assume that local controller B has already sent a message event to the central controller.

As shown in FIG. 8, the timing diagram shows 25 columns, with each column being a clock cycle. The central controller issues a command (803) to local controller B, which is at position 2, by sending the command (803) on the ring network during a clock cycle when the CC cycle counter reads "2".

As discussed above, local controller A is at position 1. Therefore, local controller A stores "1" in its position register. Moreover, local controller A will receive the command before it reaches local controller 2. However, local controller A will receive the command when the LC cycle counter in local controller A reads "2." This is a mismatch (805) with the position register of local controller A. In other words, the LC cycle counter in local controller A and the position register of local controller A will not be equal when local controller A receives the command. Accordingly, local controller A sends (relays) the command (807) to the ring network.

As discussed above, local controller B is at position 2. Therefore, local controller B stores "2" in its position register. Local controller B will receive the command when the LC cycle counter in local controller B is "2". In other words, the LC cycle counter in local controller B and the position register of local controller B will be equal when the command is received by local controller B. In response to this match (809), local controller B forwards the command to the local unit (not shown) connected to local controller B for execution. In one or more embodiments of the invention, local controller B does not send (i.e., relay) the command to the ring network because local controller B is the proper/intended recipient of the command.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system, comprising:
   a first local controller (LC) having a first position in a ring network and comprising a first LC cycle counter,
   wherein the first LC is configured to send a first event message on the ring network during a first clock cycle in response to the first LC cycle counter matching the first position during the first clock cycle;
   a second LC having a second position in the ring network and comprising a second LC cycle counter,
   wherein the second LC is configured to send a second event message on the ring network during a second clock cycle in response to the second LC cycle counter matching the second position during the second clock cycle; and
   a central controller (CC) connected to the ring network and comprising:
   a data structure linking the first LC to the first position and linking the second LC to the second position; and
   a CC cycle counter configured to store the first position during a third clock cycle and to store the second position during a fourth clock cycle,
   wherein the CC is configured to send, on the ring network, a first command to the first LC during the third clock cycle and a second command to the second LC during the fourth clock cycle.

2. The system of claim 1, wherein the CC is further configured to send, on the ring network, a first start value to trigger a training phase, a second start value to start the first LC cycle counter and the second LC cycle counter, and a third start value to set a maximum value of the first LC cycle counter and the second LC cycle counter.

3. The system of claim 1, further comprising:
   a first local unit connected to the first LC and comprising a circuit configured to generate the first event message;
   a second local unit connected to the second LC and comprising a circuit configured to generate the second event message;
   a central unit connected to the CC and comprising a circuit configured to:
   generate the first command based on an identification value of the first LC and the first event message; and
   generate the second command based on an identification value of the second LC and the second event message.

4. The system of claim 1, wherein the CC further comprises a Single Error Correcting (SEC) unit to perform error checking and correction on the first event message received from the ring network.

5. The system of claim 1, wherein the first LC further comprises a Single Error Correcting (SEC) unit to perform error checking and correction on the first command received from the ring network.

6. The system of claim 1, wherein the ring network comprises a fatal event line, wherein the first LC and the second LC only send event messages regarding fatal events in response to the fatal event line being asserted.

7. The system of claim 1, wherein the CC, the first LC, the second LC, and the ring network are located on a single chip.

8. The system of claim 2, wherein the second LC further comprises:
   a position register;
   a node ID register storing an identification value of the second LC; and
   a node type register storing a type of the second LC, wherein the second LC is further configured to:

receive, from the ring network, the first start value and a set of identification values including an identification value of the first LC;

determine the second position of the second LC based on a cardinality of the set;

store the second position in the position register;

concatenate the identification value of the second LC to the set of identification values; and send, on the ring network, the first start value and the set of identification values.

9. The system of claim 3, wherein the first LC further comprises a first event tracker to store the first event message received from the first local unit, and wherein the second LC further comprises a second event tracker to store the second event message received from the second local unit.

10. The system of claim 3, wherein the ring network is a bus of 16 lines, wherein the first local unit is one selected from a group consisting of a link unit, a protocol unit, and a memory controller unit, and wherein the second local unit is one selected from the group.

11. The system of claim 8, wherein the data structure in the CC stores the set of identification values received from the ring network.

12. A method of operating a central controller (CC) connected to a first local controller (LC) and a second local controller (LC) by a ring network, comprising:

receiving, by the CC and from the ring network, a first event message during a first clock cycle and a second event message during a second clock cycle, wherein the first event message is generated by the first LC and the second event message is generated by the second LC;

reading, by the CC, a first value from a CC cycle counter during the first clock cycle and a second value from the CC cycle counter during the second clock cycle;

retrieving, by the CC and from a data structure in the CC, an identification value of the first LC based on the first value and an identification value of the second LC based on the second value;

sending, in response to the CC cycle counter having the first value during a third clock cycle, a first command on the ring network for the first LC during the third clock cycle; and sending, in response to the CC cycle counter having the second value during a fourth clock cycle, a second command on the ring network for the second LC during the fourth clock cycle.

13. The method of claim 12, further comprising:

sending, by the CC on the ring network, a first start value to trigger a training phase;

starting, by the CC, the CC cycle counter in response to sending the first start value;

receiving, by the CC and from the ring network, the first start value;

receiving, by the CC and from the ring network, the identification value of the first LC after the first start value is received, wherein the first LC sends the identification value of the first LC on the ring network in response to the first start value;

receiving, by the CC and from the ring network, the identification value of the second LC after the identification value of the first LC is received, wherein the second LC sends the identification value of the second LC in response to the first start value; and setting, by the CC, a maximum value of the CC cycle counter in response to receiving the first start value, the identification value of the first LC, and the identification value of the second LC.

14. The method of claim 12, wherein the first event message is generated by a circuit in a local unit connected to the first LC, wherein the first event message is a fatal error, wherein the first command is generated by a central unit connected to the CC, and wherein the first command is a cease operations instruction for the local unit.

15. The method of claim 13, further comprising:

sending, by the CC and on the ring network, a second start value, wherein the second start value triggers a first LC cycle counter in the first LC, and wherein the second start value triggers a second LC cycle counter in the second CL;

receiving on the ring network, by the CC, the second start value; and sending, by the CC and on the ring network, a third start value in response to receiving the second start value to trigger an active phase.

16. The method of claim 14, wherein the ring network is a bus of 16 lines, wherein the local unit is one selected from a group consisting of a link unit, a protocol unit, and a memory controller unit.

17. A method of operating a plurality of local controllers (LCs) connected to a central controller (CC) by a ring network, comprising:

receiving, by a first LC comprising a LC cycle counter and a position register storing a position of the first LC in the ring network, an event message from a local unit;

sending, in response to the LC cycle counter matching the position during a first clock cycle, the event message on the network ring during the first clock cycle;

receiving, by the first LC from the ring network, a command from the CC during a second clock cycle, wherein the LC cycle counter matches the position during the second clock cycle, and wherein the command is in response to the event message; and sending, by the first LC, the command to the local unit.

18. The method of claim 17, further comprising:

receiving, by the first LC and from the ring network, a first start value and a set of identification values comprising an identification value of a second LC, wherein the second LC receives the first start value before the first LC;

determining, by the first LC, the position of the first LC in the ring network based on a cardinality of the set of identification values;

storing, by the first LC, the position in the position register;

concatenating an identification value of the first LC to the set of identification values; and sending, by the first LC on the ring network, the first start value and the set of identification values.

19. The method of claim 17, wherein the event message reports a non-fatal error at the local unit, and wherein the command is a link reset.

20. The method of claim 18, further comprising:

receiving, by the first LC and from the ring network, a second start value;

starting, by the first LC, the LC cycle counter in response to receiving the second start value;

sending, by the first LC on the network ring, the second start value generated by the CC;

receiving, by the first LC and from the ring network, a third start value generated by the CC to trigger an active phase; and setting a maximum value of the LC cycle counter in response to receiving the third start value.

\* \* \* \* \*

UNITED STATES PATENT AND TRADEMARK OFFICE
CERTIFICATE OF CORRECTION

PATENT NO. : 9,608,839 B2  
APPLICATION NO. : 14/527385  
DATED : March 28, 2017  
INVENTOR(S) : Schulz et al.

Page 1 of 1

It is certified that error appears in the above-identified patent and that said Letters Patent is hereby corrected as shown below:

In the Specification

In Column 3, Line 64, delete "131)," and insert -- 131). --, therefor.

In the Claims

In Column 12, Line 17, in Claim 15, delete "CL;" and insert -- LC; --, therefor.

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*